United States Patent [19]

Spears et al.

[11] Patent Number: 5,288,728
[45] Date of Patent: Feb. 22, 1994

[54] PROCESS FOR RECOVERING SILVER FROM PHOTOGRAPHIC SOLUTIONS

[75] Inventors: Nathan O. Spears; Ernest R. Anderson, both of Rochester; Elizabeth A. Murphy, Somers, all of N.Y.

[73] Assignee: Eastman Kodak Company, Rochester, N.Y.

[21] Appl. No.: 946,503

[22] Filed: Sep. 17, 1992

[51] Int. Cl.$^5$ .................................................. C02F 1/62
[52] U.S. Cl. ..................... 210/729; 210/912; 423/42; 430/398; 430/399; 430/400
[58] Field of Search .................. 210/912, 719, 729; 423/42; 430/398–400

[56] References Cited

U.S. PATENT DOCUMENTS

| | | | |
|---|---|---|---|
| 3,778,368 | 12/1973 | Nukamura et al. | 210/54 |
| 3,829,549 | 8/1974 | Anderson et al. | 210/721 |
| 4,128,424 | 12/1978 | Geyken et al. | 210/759 |
| 4,172,784 | 10/1979 | Knorre et al. | 210/912 |
| 4,740,244 | 4/1988 | Williams | 210/719 |
| 4,755,453 | 7/1988 | Kunda et al. | 210/912 |
| 4,822,496 | 4/1989 | Griffiths et al. | 210/721 |
| 4,963,660 | 10/1990 | Mrotzeck et al. | 534/618 |
| 5,085,836 | 2/1992 | Booker | 210/719 |
| 5,188,662 | 2/1993 | McGuckon et al. | 210/757 |

FOREIGN PATENT DOCUMENTS 1411985 10/1975 United Kingdom .

Primary Examiner—Neil M. McCarthy
Attorney, Agent, or Firm—David F. Janci

[57] ABSTRACT

Silver is recovered from a mixture of seasoned photo-processing solutions by contacting the solutions with a mercapto-s-triazine or water-soluble salt thereof, the mercapto-s-triazine having the formula

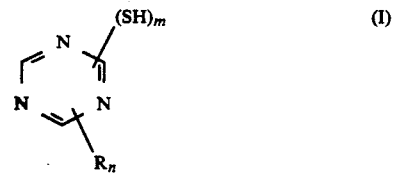

wherein:
R is hydrogen, —NH$_4$, —OH, alkyl having 1 to 8 carbon atoms, alkoxy having 1 to 8 carbon atoms, phenyl, cyclohexyl, oxazinyl, phenoxy, —NR'$_2$ or SR";

wherein
R' is hydrogen, alkyl having 1 to 8 carbon atoms, phenyl, cyclohexyl, naphthyl or benzyl;

and wherein
R" is alkyl having 1 to 8 carbon atoms, phenyl, cyclohexyl, naphthyl or benzyl;
m is an integer from 1 to 3; and
n is 0 or an integer from 1 to 2.

Using these compounds, silver ion complexes with the compound of formula I and the complex can be allowed to settle and separated from the solutions to decrease silver ion concentration in the solutions. The mixture of solutions includes a seasoned stabilizer solution and other seasoned solutions, including bleach, bleach-fix, and developer.

6 Claims, No Drawings

PROCESS FOR RECOVERING SILVER FROM PHOTOGRAPHIC SOLUTIONS

FIELD OF INVENTION

The present invention relates to a process of recovering silver from combined seasoned photographic effluent solutions by adding a mercapto-s-triazine compound to the combined solutions.

BACKGROUND OF THE INVENTION

The commercial processing of photographic materials produces seasoned solutions containing silver ions. Environmental regulations restrict the discharge of such solutions to within acceptable concentrations of silver that are much less than the concentrations of silver in the seasoned solutions. Various methods of removing silver from these solutions have been attempted, with varying expense and success.

The most common types of silver recovery in current use include the use of steel wool recovery cartridges ("CRC's"), electrolysis, and ion exchange. CRC's are messy and not always reliable. Electrolysis is expensive, requires significant maintenance, and can result in ammonia gas generation. Ion exchange is costly and impractical for smaller photoprocessors and minilabs. Another silver recovery process employs sodium sulfide as a precipitating agent, but this process can result in the evolution of toxic fumes.

Another approach has been use a silver complexing agent to remove silver from particular photographic effluent solutions.

UK 1411985 describes a method of removing silver ions from photographic bleach-fix solutions using precipitating compounds such as dimercaptotriazoles.

U.S. Pat. No. 3,778,368 describes a method of removing a harmful metal such as silver from waste water using trimercapto-s-triazines or their salts.

A problem with these approaches is that separate separation facilities and equipment are required for the individual solutions, which can be inconvenient and expensive, particularly for small photoprocessing labs or minilabs. Furthermore, these processes do not provide a process capable of recovering silver from minilab effluent solutions such as photographic stabilizers to obtain a sufficiently low silver concentration acceptable for discharge to the environment.

It is an object of the invention to provide a process for recovering silver from seasoned photographic solutions, including stabilizers, capable of lowering silver concentration in the solutions to within acceptable environmental discharge limits.

SUMMARY OF THE INVENTION

The present invention is directed to a process of removing silver ion from a mixture of seasoned photoprocessing solutions, comprising contacting the mixture of seasoned photoprocessing solutions with a mercapto-s-triazine or water-soluble salt thereof, the mercapto-s-triazine having the formula

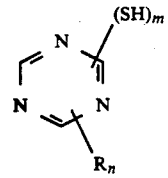

wherein:
R is hydrogen, $-NH_4$, $-OH$, alkyl having 1 to 8 carbon atoms, alkoxy having 1 to 8 carbon atoms, phenyl, cyclohexyl, oxazinyl, phenoxy, $-NR'_2$ or $SR''$;

wherein
R' is hydrogen, alkyl having 1 to 8 carbon atoms, phenyl, cyclohexyl, naphthyl or benzyl;

and wherein
R" is alkyl having 1 to 8 carbon atoms, phenyl, cyclohexyl, naphthyl or benzyl;
m is an integer from 1 to 3; and
n is 0 or an integer from 1 to 2.

The invention is also directed to a process of recovering silver from a seasoned photographic stabilizer solution, comprising the steps of:
contacting the stabilizer solution with another seasoned photographic effluent solution that is not a photographic stabilizer solution to form a combined solution; and
contacting the combined solution with a compound of formula I or water-soluble salt thereof.

The invention provides a process by which silver can be efficiently and substantially recovered from seasoned photographic effluent solutions to within acceptable environmental discharge limits for the solutions. It is less expensive, simpler to operate, more reliable, and safer than other silver recovery processes.

DESCRIPTION OF THE PREFERRED EMBODIMENTS

The recovery of silver from the mixture of seasoned photographic solutions, and in particular from a mixture of such solutions that includes a seasoned photographic stabilizer solution, is carried out by contacting the mixture with a compound of formula I. Silver present in solution forms a water-insoluble complex with the compound of formula I that can precipitate from the solution and be separated off therefrom, for example by filtration or centrifuging, with or without the addition of a clarifier or flocculating agent. The solution is then substantially free of silver ion and within acceptable environmental discharge limits. The silver ion concentration can be decreased to levels as low as 1 ppm or less in the process of the invention.

In general, the process of the invention is carried out in a pH range from about 6 to about 14, and preferably from about 6 to about 9. A higher pH is preferred because the silver-compound of formula I complex (hereinafter "silver complex") is less soluble at a higher pH and will precipitate more readily. The pH may be adjusted by conventional means to suit the operator.

The salt form of the compounds of formula I are preferred for the process of the invention for their increased solubility compared to their acid form. A preferred such formula I compound is a trimercapto-s-triazine, and in particular the trisodium salt of trimercapto-s-triazine, which is sold by Degussa under the product name "TMT-15".

The process of the invention can be carried out at a temperature in the range of from about 0° C. to about 100° C. The compound of formula I can be provided in solid (powdered) form or in the form of an aqueous suspension or an aqueous solution for contacting the mixture of seasoned solutions. A preferred solution temperature is about 15° C. to about 64° C.

The amount of compound I used to contact the mixture of seasoned solutions can be determined based on the concentration of silver ion in the mixture. Generally, it is desirable to use in excess of the stoichiometric quantity ratio of the compound to the silver concentration, as may be seen from the examples below. The concentration of silver in the mixture of seasoned solutions can first be determined by means of conventional analytical methods, for example, photometry, potentiometry, or atomic absorption spectroscopy. The operator can also make a best estimate based on the knowledge of the seasoned solutions and the proportions of each such solution present. For example, a bleach-fix solution that is removed from a minilab tank after the system has reached a substantially steady state condition can have a reasonably predictable silver concentration. The excess amount used is dependent on which compound of formula I is used, which can readily be determined by the operator based on preliminary tests with the specific compound to be used. Using the trisodium salt of trimercapto-s-triazine, a preferred amount is from about 1 mole to about 3 moles per 3 moles of silver in the mixture of seasoned solutions undergoing treatment, and particularly preferred is from about 1.25 moles to about 1.5 moles per 3 moles of silver. The ratio is provided per 3 moles of silver since each molecule of trimercapto-s-triazine is capable of complexing 3 silver ions.

The process of the invention obtains a surprisingly good degree of silver recovery from a seasoned stabilizer solution when combined with another seasoned photographic effluent solution or solutions as compared with the degree of silver recovery from the seasoned stabilizer solution alone. This is especially important when treating seasoned stabilizer produced in a minilab. Unlike stabilizer used in other commercial photoprocessing operations, minilab stabilizer generally does not undergo a wash process, and its constituents such as silver are therefore present in undiluted concentrations. Removal of silver from such seasoned minilab stabilizer may thus be necessary in order to comply with silver concentration discharge regulations. The examples below demonstrate the remarkable silver recovery from seasoned stabilizer demonstrated by the process of the invention. Accordingly, a preferred mixture of seasoned solutions treated in the process of the invention includes a seasoned photographic stabilizer solution. The seasoned solutions can comprise combined minilab effluent solutions, such as a combined fixer, bleach fixer, stabilizer, and bleach solution. The combined solutions can also include a seasoned developer solution, although when seasoned developer is present as a significant proportion of the mixture it can result in a larger complex particle size, longer complex settling times, and more flocculant.

The mixture of seasoned solutions can be agitated as the complexing agent is added to obtain optimum mixing and reaction rate, forming a product solution having a solid phase and a liquid phase. A flocculant can optionally be added to enhance separation of the complexed silver. The treated mixture of solutions can conveniently be held in a holding vessel, which can be incorporated either into a batch, a continuous, or a semi-continuous treatment system. The solution can then be retained in the vessel for a time sufficient to allow silver complex to settle. It is believed that the hold-up step is also a conditioning period in which finer particles of the silver complex dissolve and reprecipitate onto the larger particles, reducing the number of small particles present. This clearly aids subsequent separation of the solid and liquid phases and enhances separation efficiency, conferring an advantage over immediate separation having a short hold-up time.

The complexed silver can be separated by standard separation techniques, such as filtration, centrifugation, and reverse osmosis and the like. For example, as in the minilab context, the operator can periodically filter out the precipitant while allowing treated solution to overflow from a reaction vessel to a collecting vessel for further treatment or direct discharge to the sewer. Optionally, the separation technique selected can be used in combination with other filtering or handling procedures such as described herein.

The invention is further illustrated by the following examples of its practice.

EXAMPLE 1

Seasoned photographic processing solutions are obtained from minilab processing of film or paper, and after the recommended number of tanks are used to attain the steady state condition for the specific minilab processor, the seasoned solutions are obtained as follows:

A first seasoned bleach solution ("Bleach A") is prepared using a Pako Cine processor model 35-16, processing Kodak 100 and 200 speed film at a solution replenishment rate of 80 ml/square foot of film. Seasoned Bleach A has the following composition:

37.4 g of 1,3-PDTA (1,3-propylenediamine tetraacetic acid)
70 ml of a 57% by weight ammonium hydroxide solution
80 ml of acetic acid
0.8 g of DPTA (1,3diamino-2-propanol tetraacetic acid)
25 g of ammonium bromide
44.85 g of $Fe(NO_3)_3 \cdot H_2O$
silver, as specified below for the combined and/or individual solutions
Water to one liter
pH=4.75

A second seasoned bleach solution ("Bleach B") is prepared using a system 50 Kodak minilab processing Kodak 100 to 400 film at a solution replenishment rate of 5 ml/roll, the film contacting the bleach solution for about 45 seconds. Seasoned Bleach B has the following composition:

113.4 g of 1,3-PDTA
47 ml of acetic acid
94.5 g of ammonium bromide
100 ml of a 57% by weight ammonium hydroxide solution
0.95 g of DPTA
135.9 g $Fe(NO_3)_3 \cdot H_2O$
silver, as specified below for the combined and/or individual solutions
Water to one liter
pH=4.60

A seasoned fixer solution ("Fixer A") is prepared using a Pako Cine processor model 35-16 processing Kodak 100 and 200 film at a solution replenishment rate of 80 ml/square foot. Seasoned Fixer A has the following composition:

162 ml of a 56.5% by weight ammonium thiosulfite and 4 percent by weight ammonium sulfite solution
16 g of sodium sulfite
1.9 g of sodium hydroxide
1.1 g of the disodium salt of EDTA (ethylenediaminetetra acetic acid)
6 ml of acetic acid
8.1 g sodium bromide
1 g potassium iodide
silver, as specified below for the combined and/or individual solutions
Water to one liter
pH=6.5

A seasoned fixer solution ("Fixer B") is prepared using a system 50 Kodak minilab processing Kodak 100 to 400 speed film at a solution replenishment rate of 35 ml/roll, the film contacting the fixer for about 90 seconds. Seasoned Fixer B has the following composition:

180 ml of a 56.5% by weight ammonium thiosulfite and 4 percent by weight ammonium sulfite solution
25 g of sodium sulfite
1.2 g of the disodium salt of EDTA
160 g of ammonium thiocyanate
4.8 ml acetic acid
8.1 g sodium bromide
1 g potassium iodide
silver, as specified below for the combined and/or individual solutions
Water to one liter
pH=6.2

A seasoned stabilizer ("Stabilizer A") is prepared using a system 50 Kodak minilab processing Kodak 100 to 400 speed film at a replenishment rate of 40 ml/roll. Stabilizer A has the following composition:

35 to 40 weight percent of hexamethylenetetramine
0.01 to 1 weight percent of a substituted thiazolin-3-one
0.01 to 1 weight percent polymaleic acid
5 to 10 weight percent of a nonionic surfactant
silver, as specified below for the combined and/or individual solutions A seasoned bleach-fix ("Bleach-Fix A") is prepared using a Kodak system 40 minilab processing seasoner paper (a white field with a black stripe) at a solution replenishment rate of 20 ml/square foot. Bleach-Fix A has the following composition:

0.42M ammonium thiosulfate
0.04M ammonium sulfite
0.05M sodium metabisulfite
0.11M ferric ammonium EDTA
0.01M EDTA
0.14M acetic acid
silver, as specified below for the combined and/or individual solutions
pH=6.0 to 6.5

A seasoned bleach-fix ("Bleach-Fix B") is prepared using a Kodak model 22LL using a seasoner paper as described for Bleach-Fix A at a solution replenishment rate of 5 ml/square foot. Bleach-Fix B has the following composition:

0.58M ammonium thiosulfate
0.05M ammonium sulfite
0.04M sodium metabisulfite
0.13M ferric ammonium EDTA
0.01M EDTA
0.29M acetic acid silver, as specified below for the combined and/or individual solutions
pH=6.0 to 6.5

A seasoned stabilizer ("Stabilizer B") is prepared using a Kodak system 40 minilab using a seasoner paper as described for Bleach-Fix A at a solution replenishment rate of 23 ml/square foot. Stabilizer B has the following composition:

1 to 5 weight percent of polyvinylpyrrolidone
0.01 to 1 weight percent of a substituted thiazolin-3-one
1 to 5 weight percent of an organosilicone The component concentrations in the seasoned compositions described above, as well as the pH of each solution, may vary, generally within about plus or minus 10 percent, depending on the starting solution concentrations, amount of film processed, and processing conditions and the like.

EXAMPLE 2

Silver recovery tests were separately carried out on Stabilizer A and Stabilizer B. 50 ml of the seasoned stabilizer was placed in a 100 ml glass bottle. 4 ml of a 15 by weight percent solution of the trisodium salt of 2,4,6-trimercapto-s-triazine ("TMT-15") was added to the bottle, and the bottle was capped and shaken for 30 seconds. The silver-TMT salt was removed by filtration through 1.5 $\mu$ Whatman 934H filter paper in a Buchner funnel. Silver concentrations for the starting solution and the filtrate were determined by atomic absorption, with the following results:

|  | Initial silver concentration (mg/L) | Final silver concentration (mg/L) |
| --- | --- | --- |
| Stabilizer A | 161.0 | 60.0 |
| Stabilizer B | 404.0 | 359.0 |

The results show that, although TMT-15 removes silver, it does not decrease silver concentration in individually treated stabilizer solutions to below 3 ppm, a level that is desirable to meet various environmental discharge limits.

EXAMPLE 3

Tests were run as in Example 2 but on other prepared seasoned solutions and using the specified molar ratio of TMT-15 per 3 moles of silver in the initial solution. The results are as follows:

|  | Initial silver concentration (mg/L) | Final silver concentration (mg/L) |
| --- | --- | --- |
| Fixer A (1.53 moles TMT per 3 moles silver) | 11,700 | 9.4 |
| Bleach-Fix A (5.45 moles TMT per 3 moles of silver) | 3,280 | 13.8 |
| Bleach A (>100,000 moles TMT per 3 moles of silver) | 10.7 | 0.3 |

The results show that, as in Example 2, aside from massive overdosing with TMT to Bleach A, treatment with TMT-15 did not decrease silver concentration in the individually treated solutions to within acceptable limits.

EXAMPLE 4

A mixture of solutions was prepared having the following constituents by volume:
9% Bleach-Fix A
41% Stabilizer B
16% Fixer A
18% Stabilizer A
16% Bleach A Tests were conducted as in Example 2, the molar ratio of TMT-15 to 3 moles silver in run 1 being 1.38 and in run 2 being 1.9, with the following results:

|  | Initial silver concentration (mg/L) | Final silver concentration (mg/L) |
| --- | --- | --- |
| Run 1 (1.38 moles TMT per 3 moles silver) | 3,240 | 2.2 |
| Run 2 (1.9 moles TMT per 3 moles of silver) | 3,240 | 1.1 |

The results show that the silver recovery process of the invention is surprisingly effective using combined seasoned process solutions as compared to treating the solutions individually. The results are especially good with respect to the seasoned stabilizer solutions when compared with Example 2.

EXAMPLE 5

Mixtures of seasoned solutions were prepared with the following volumetric amounts of constituent solutions:

Solution 1:
  80 ml Bleach-Fix A
  92 ml Stabilizer B
  35 ml Fixer A
  40 ml Stabilizer A
  35 ml Bleach A
Solution 2:
  80 ml Bleach-Fix A
  92 ml Stabilizer B
  35 ml Fixer A
  40 ml Stabilizer A
  5 ml Bleach A
Solution 3:
  80 ml Bleach-Fix A
  92 ml Stabilizer B
  35 ml Fixer B
  40 ml Stabilizer A
  5 ml Bleach B
Solution 4:
  20 ml Bleach-Fix B
  92 ml Stabilizer B
  35 ml Fixer A
  40 ml Stabilizer A
  35 ml Bleach A
Solution 5:
  20 ml Bleach-Fix B
  92 ml Stabilizer B
  35 ml Fixer A
  40 ml Stabilizer A
  5 ml Bleach A
Solution 6:
  20 ml Bleach-Fix B
  92 ml Stabilizer B
  35 ml Fixer B
  40 ml Stabilizer A
  5 ml Bleach B Tests were run as in Example 2 for each solution for different molar amounts of TMT-15, given as mole fraction to silver in the Table below, with the results as follows:

| Moles TMT-15 per 3 Moles Ag | Final Silver Concentration (mg/L) of SOLUTION: | | | | | |
| --- | --- | --- | --- | --- | --- | --- |
|  | 1 | 2 | 3 | 4 | 5 | 6 |
| 0 (Control) | 1610.0 | 1800.0 | 1680.0 | 1980.0 | 2240.0 | 2320.0 |
| 0.5 | 1020.0 | 787.0 | 799.0 | 608.0 | 1120.0 | 1300.0 |
| 1.00 | 428.0 | 45.9 | 71.0 | 240.0 | 171.0 | 345.0 |
| 1.25 | 377.0 | 5.0 | 3.5 | 140.0 | 9.3 | 66.0 |
| 1.50 | 79.9 | 3.9 | 2.3 | 18.2 | 0.8 | 3.0 |
| 1.75 | 17.5 | 1.4 | 2.3 | 11.2 | 0.8 | 1.4 |
| 2.00 | 17.6 | 1.2 | 1.3 | 5.8 | 0.6 | 0.6 |
| 2.50 | 4.6 | 1.3 | 0.7 | 2.0 | 0.4 | 0.4 |
| 2.75 | 3.1 | 1.5 | 0.6 | 1.2 | 0.4 | 0.9 |
| 3.00 | 3.1 | 0.4 | 0.7 | 0.5 | 0.3 | 0.5 |

The results show that good silver recovery is obtained using TMT-15, especially at the ratios of from about 1.25 moles and up of TMT-15 per 3 moles of silver in solution.

The invention has been described in detail with particular reference to preferred embodiments thereof, but it will be understood that variations and modifications can be affected within the spirit and scope of the invention.

We claim:

1. A process of removing silver ion from a mixture of seasoned photoprocessing solutions containing stabilizer, bleach, fixer and bleach-fix solutions, in order to lower dissolved silver concentration in the mixture to less than 3 parts per million, comprising contacting the mixture of seasoned photoprocessing solutions with a mercapto-s-triazine or water-soluble salt thereof, the mercapto-s-triazine having the formula:

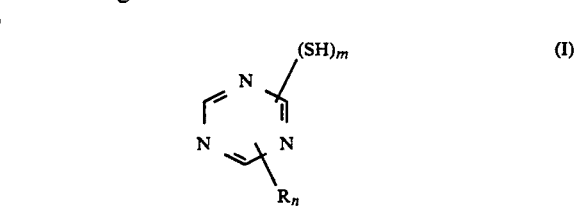

wherein:
R is hydrogen, $-NH_4$, $-OH$, alkyl having 1 to 8 carbon atoms, alkoxy having 1 to 8 carbon atoms, phenyl, cyclohexyl, oxazinyl, phenoxy, $-NR'_2$ or $SR''$; wherein R' is hydrogen, alkyl having 1 to 8 carbon atoms, phenyl, cyclohexyl, naphthyl or benzyl;

and wherein
R" is alkyl having 1 to 8 carbon atoms, phenyl, cyclohexyl, naphthyl or benzyl;
m is an integer from 1 to 3; and
n is 0 or an integer from 1 to 2.

2. The process of claim 1, wherein the compound of formula I is a trimercapto-s-triazine.

3. The process of claim 2, wherein the compound of formula I is the trisodium salt of 2,4,6-trimercapto-s-triazine.

4. The process of claim 3, wherein the contacting amount of the trisodium salt of 2,4,6-trimercapto-s-triazine is from about 1 mole to about 3 moles per 3 moles of silver present in the mixture of seasoned photoprocessing solutions.

5. The process of claim 1, further comprising agitating the mixture of seasoned photoprocessing solutions when the compound of formula I is added thereto whereby a product solution having a solid phase and a liquid phase is formed.

6. The process of claim 5, further comprising separating the solid and liquid phases.

* * * * *